(12) United States Patent
Liebeskind et al.

(10) Patent No.: US 8,138,231 B2
(45) Date of Patent: *Mar. 20, 2012

(54) POLYMER HAVING OXYCARBON GROUP, AND USE THEREOF

(75) Inventors: Lanny S. Liebeskind, Atlanta, GA (US); Ken Yoshimura, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 870 days.

This patent is subject to a terminal disclaimer.

(21) Appl. No.: 11/926,732

(22) Filed: Oct. 29, 2007

(65) Prior Publication Data

US 2009/0110995 A1     Apr. 30, 2009

(51) Int. Cl.
*C08J 5/20*     (2006.01)

(52) U.S. Cl. ............. 521/27; 524/82; 524/86; 524/107; 526/286; 526/308; 526/309

(58) Field of Classification Search .................... 429/33, 429/314; 521/25, 27; 526/286, 308, 309; 524/82, 86, 107
See application file for complete search history.

(56) References Cited

U.S. PATENT DOCUMENTS

| 4,069,201 A | * | 1/1978 | Mark ........................... 524/358 |
| 5,403,675 A | | 4/1995 | Ogata et al. |
| 5,438,082 A | | 8/1995 | Helmer-Metzmann et al. |

FOREIGN PATENT DOCUMENTS

| JP | 2003-277501 A | 10/2003 |
| JP | 2006-225624 A | 8/2006 |

OTHER PUBLICATIONS

R. Nolte et al., "Partially sulfonated poly(arylene ether sulfone)—A versatile proton conducting membrane materials for modern energy conversion technologies", Journal of Membrane Science, 83, (1993), pp. 211-220.
H. Allcock et al., "Sulfonation of (Aryloxy)- and (Arylamino) phosphazenes: Small-Molecule Compounds, Polymers, and Surfaces", Chemical Materials, 3, (1991), pp. 1120-1132.
R. West, "Oxocarbons", Academic Press, (1980), pp. 45.
E. Patton et al., "New Aromatic Anions. X. Dissociation Constants of Substituted Oxocarbon Acids", Journal of the American Chemical Society, 95, (1973), pp. 8703-8707.

* cited by examiner

*Primary Examiner* — Michael M Bernshteyn
(74) *Attorney, Agent, or Firm* — Sughrue Mion, PLLC

(57) ABSTRACT

The present invention provides a novel polymer having oxocarbon groups which is particularly useful in battery and fuel cell applications.

9 Claims, No Drawings

POLYMER HAVING OXYCARBON GROUP, AND USE THEREOF

FIELD OF THE INVENTION

This invention relates to a novel polymer having oxocarbon groups. The polymers having oxocarbon groups are particularly useful in battery and fuel cell applications.

BACKGROUND OF THE INVENTION

It is well known that polymers having sulfonic acid group are useful for a polymer electrolyte to be applied to polymer electrolyte type fuel cells and the like. The following polymers, for example, are proposed as a polymer electrolyte to be applied to polymer electrolyte type fuel cells and the like: polymers introducing sulfonic acid group into fluorine-containing polymers, typically being Nafion (a trade name of DuPont Co., Ltd.); polymers introducing sulfonic acid group into poly(ether ketone)s (U.S. Pat. No. 5,438,082); polymers introducing sulfonic acid group into poly(ether sulfone)s (J. Membrane Science, 83, 211 (1993)); polymers introducing sulfonic acid group into polyimides (Kokai (Japan unexamined patent publication) No. 2003-277501); polymers introducing sulfonic acid group into polyphenylenes (U.S. Pat. No. 5,403,675); and polymers introducing sulfonic acid group into polyphosphazenes (Chemical Material, 3, 1120, (1991)).

On the other hand, oxocarbons, for example squaric acid, croconic acid and the like, are known as high acidic functional groups due to a stable resonated structure dissociating hydrogen atom from the oxocarbon group (Oxocarbons, page 45 (Edited by Robert West), Academic Press (1980), (ISBN:0-12-744580-3); Journal of the American Chemical Society, 95, 8703 (1973)). Recently polymers having oxocarbon groups instead of sulfonic acid groups are proposed as a polymer electrolyte (Kokai (Japan unexamined patent publication) No. 2006-225624).

DISCLOSURE OF THE INVENTION

The proton conductivity of the polymers having oxocarbon groups must be improved in order to get proton exchange membrane fuel cells of higher performance. Although we needed to introduce more oxocarbon group into polymer in order to improve ion conductivity, there were no methods to introduce oxocarbon groups more than 2.5 meq/g of ion exchange capacity.

The creators of the invention have found that the oxocarbon groups of more than 3.0 meq/g can be introduced using a brominated polymer as a precursor. After producing polymers having an oxocarbon group and studying them, the creators of the invention found that the polymer having oxocarbon groups of more than 3.0 meq/g has high proton conductivity and is useful for a polymer electrolyte which is an ingredient of proton conductive membrane for polymer electrolyte membrane fuel cells which use gaseous fuels such as hydrogen gas or liquid fuels such as methanol and dimethyl-ether, and thus accomplished the present invention.

The invention provides
[1] a polymer having an oxocarbon group represented by the following formula (1)

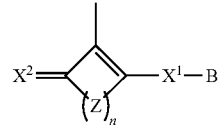

(1)

(wherein $X^1$ and $X^2$ independently represent —O—, —S—, or —NR—, and Z represents —CO—, —C(S)—, C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 10, n Z-groups may be same or different from each other; and B represents hydrogen atom or a monovalent metal atom); wherein ion exchange capacity of the polymer is bigger than 3.0 meq/g. The invention further provides:
[2] the polymer according to the above-described [1], wherein Z is at least one selected from the group consisting of —CO—, —C(S)—, and —C(NR)—;
[3] the polymer according to the above-described [1] or [2], wherein $X^1$ and $X^2$ are —O—, Z is —CO—, and n is 0 to 2;
[4] the polymer according to any one of the above-described [1] to [3], having a phenyl-phenyl bond in the main chain thereof;
[5] a polymer electrolyte including the polymer as an effective component according to any one of the above-described [1] to [4];
[6] a polymer electrolyte membrane including the polymer electrolyte according to the above-described [5];
[7] a catalytic composition including the polymer electrolyte according to the above-described [5];
[8] a polymer electrolyte membrane-electrode assembly including any one of the polymer electrolyte according to the above-described [5], the polymer electrolyte membrane according to the above-described [6], or the catalytic composition according to the above-described [7]; and
[9] a polymer electrolyte membrane fuel cell including any one of the polymer electrolyte according to the above-described [5], the polymer electrolyte membrane according to the above-described [6], the catalytic composition according to the above-described [7], or the polymer electrolyte membrane-electrode assembly according to the above-described [8].

BEST MODE FOR CARRYING OUT THE INVENTION

The detail of the invention is explained as follows.
The polymer of the invention has an oxocarbon group represented by the following formula (1)

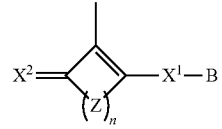

(1)

(wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution group, or aryl group with carbon number of 6 to 10 which may have substitution groups; n is a repeating number and represents the number of n=0 to 10, n Z-groups may be same or different from each other; and B represents hydrogen atom or a monovalent metal atom); and ion exchange capacity of the polymer is bigger than 3.0 meq/g.

$X^1$ and $X^2$ independently represent —O—, —S—, or —NR—; preferably —O— or —S—, and particularly preferably —O—.

The R of NR represents hydrogen atom, alkyl groups with carbon number of 1 to 6 such as methyl group, trifluoromethyl group, ethyl group, propyl group, isopropyl group, and n-butyl group, or aryl groups with carbon number of 6 to 10 such as phenyl group, pentafluorophenyl group, and naphthyl group. These alkyl group and aryl group may have substitution groups.

The Z represents —CO—, —C(S)—, —C(NR')—, alkylene group which may have substitution groups, or arylene group which may have substitution groups. The R' of NR' has the same meaning mentioned above.

Typical examples of the alkylene groups include alkylene groups with carbon number of 1 to 6 such as methylene, fluoromethylene, difluoromethylene, phenylmethylene, and diphenylmethylene. Typical examples of the arylene groups which may have substitution groups include arylene groups with carbon number of 6 to 10 such as phenylene group, naphtylene group, and tetrafluorophenylene group.

The Z is preferably —CO—, —C(S)—, or —C(NR')—; more preferably —CO—, or —C(S)—; and particularly preferably —CO—.

The n is a repeating number of Z and represents an integer of 0 to 10. When n is two or more, n Z-groups may be same or different from each other. The n is preferably 0 to 4, more preferably 0 to 2, and particularly preferably 1.

The B represents a hydrogen atom or a monovalent metal atom. The monovalent metal includes lithium atom, sodium atom, potassium atom, cesium atom, silver atom, and the like. The B preferably includes hydrogen atom, lithium atom, and sodium atom; more preferably hydrogen atom and lithium atom; and particularly preferably hydrogen atom.

Ion exchange capacity means the number of moles of the cation exchange group per 1 gram of polymer in this invention. The ion exchange capacity can be determined by the equation below.

(Number of moles of cation exchange group in the polymer, mol)/(Number of grams of the polymer, g)×1000=(Ion exchange capacity, meq/g)

The polymer of the invention must have an ion exchange capacity of bigger than 3.0 meq/g so that it has good ion conductivity. If the polymer has an ion exchange capacity of less than 3.0 meq/g, it would cause low ion conductivity.

According to the book of reference (Oxocarbons, page 12 (Edited by Robert West), Academic Press (1980), (ISBN:0-12-744580-3)), the structure having NR or S instead of O in oxocarbons is called pseudo-oxocarbons. In this invention, the structure represented by the formula (1) is called oxocarbon group even if the structure represented by the formula (1) does not include any oxygen atom.

Preferable oxocarbon groups are exemplified as follows:

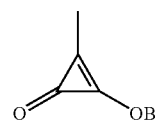

(1a)

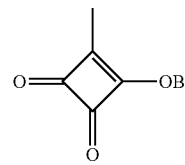

(1b)

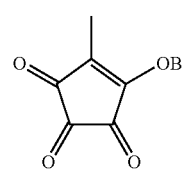

(1c)

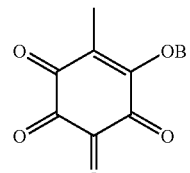

(1d)

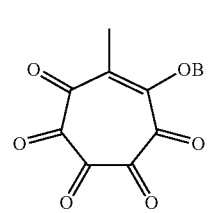

(1e)

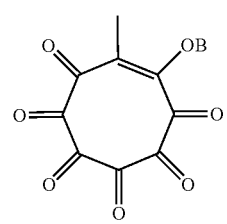

(1f)

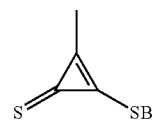

(1g)

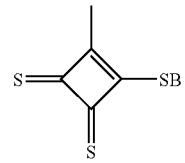

(1h)

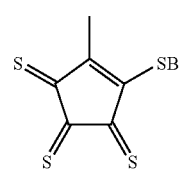

(1i)

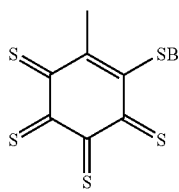
(1j)

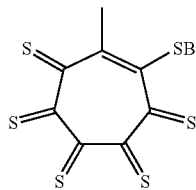
(1k)

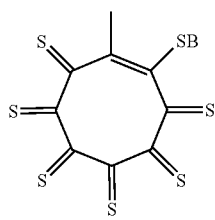
(1l)

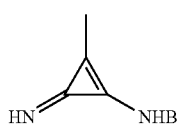
(1m)

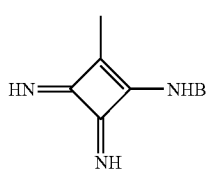
(1n)

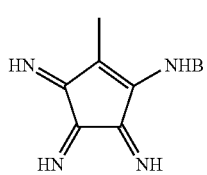
(1o)

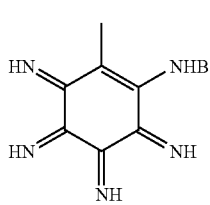
(1p)

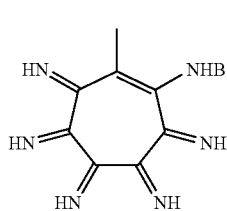
(1q)

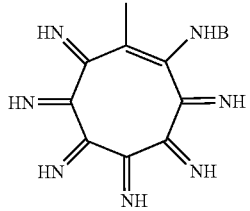
(1r)

Among above examples, preferable oxocarbon groups are (1a) to (1d); more preferable oxocarbon groups are (1a) to (1c), much more preferable oxocarbon groups are (1b) to (1c), and most preferable oxocarbon group is (1b).

The oxocarbon group may be in a form of free acid as B being hydrogen atom or salt as B being a monovalent metal atom. The polymer having the oxocarbon group of the invention may be composed of repeating units all of which are coupled with an oxocarbon group or some of which are not coupled with an oxocarbon group. The repeating unit may be coupled with two or more of oxocarbon groups. The oxocarbon groups coupled to the repeating units of the polymer may be same or different from each other, or the B in the formula (1) may be hydrogen atom or a monovalent metal atom. When being used as an component of polymer electrolyte membrane fuel cells, in view of power generation ability, all of oxocarbon groups coupled to the repeating units are preferably substantially in a form of free acid.

The monovalent metal atom is preferably lithium atom, sodium atom, or potassium atom; more preferably lithium atom or sodium atom; and particularly preferably lithium atom.

The polymer of the invention is characterized by having an oxocarbon group represented by the formula (1), thus, repeating units composing the polymer are not particularly limited as long as the polymer has the oxocarbon group, the polymer including vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof, and mixtures thereof.

A vinyl polymer having an oxocarbon group represented by the formula (1) mentioned above, for example, includes polymers having a repeating unit represented below; wherein A represents the formula (1) mentioned above, and m, p, and q represent repeating numbers (hereinafter, representing same meanings), wherein m is usually 20 or more, p is usually 0 to 3, and q is usually 1 to 5.

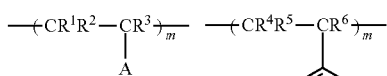

-continued

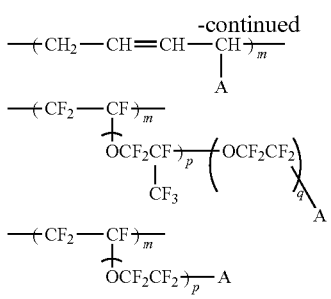

(wherein $R^1$ to $R^6$ independently represent hydrogen atom, fluorine atom, chlorine atom, methyl group, and trifluoromethyl group).

A polyoxyalkylene having an oxocarbon group represented by the formula (1) and a polysiloxane having an oxocarbon group represented by the formula (1) are exemplified by polymers having a repeating unit represented below.

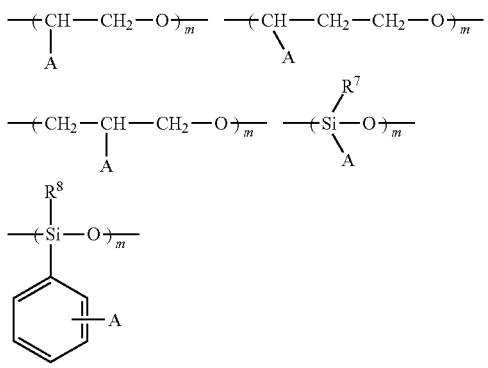

In the above structural formulas, $R^7$ and $R^8$ independently represent hydrogen atom, fluorine atom, chlorine atom, methyl group, trifluoromethyl group, or phenyl group. A polyester having an oxocarbon group represented by the formula (1) is exemplified by a polymer having a repeating unit in which an oxocarbon group is coupled with a repeating unit represented below, and the oxocarbon group substitutes any of substitutable hydrogen atoms of the repeating units represented below; the oxocarbon group preferably substitutes a hydrogen atom on an aromatic ring.

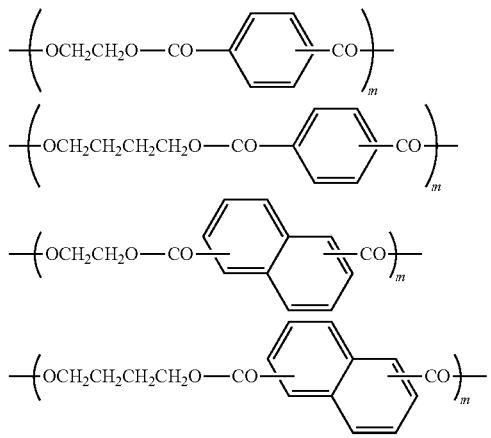

A polyimide having an oxocarbon group represented by the formula (1) is exemplified by a polymer having a repeating unit in which an oxocarbon group is coupled with a repeating unit represented below, and the oxocarbon group substitutes any of substitutable hydrogen atoms of the repeating units represented below.

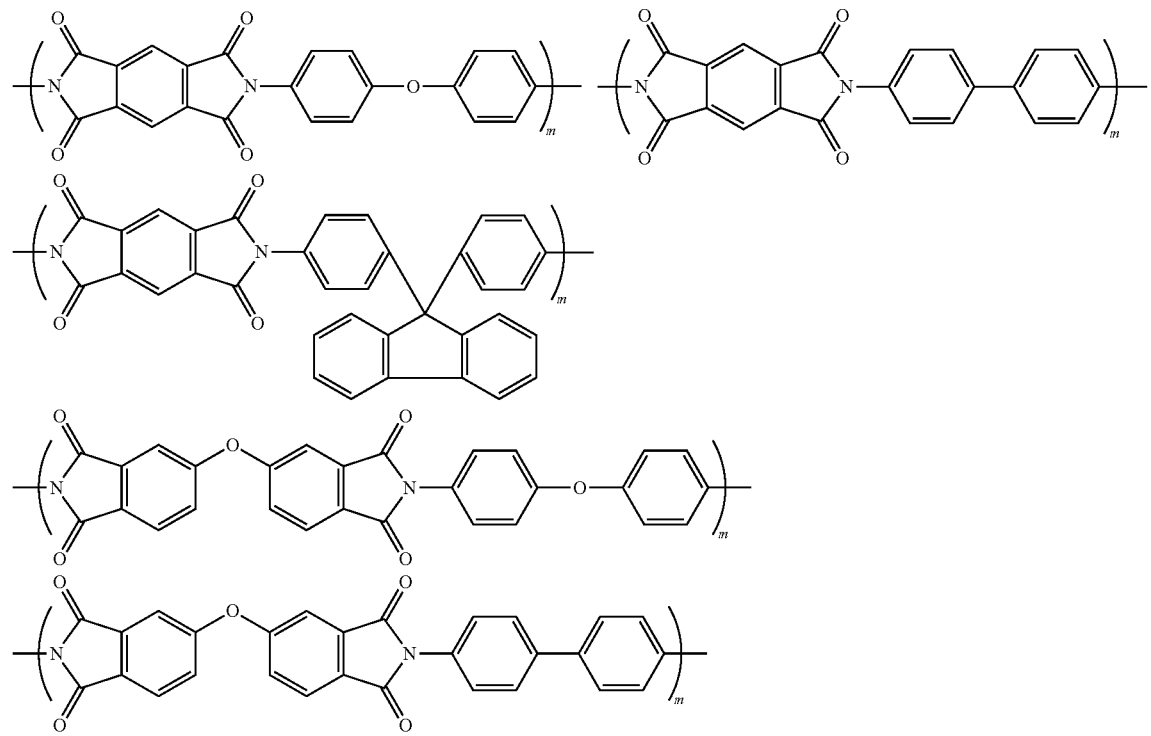

-continued
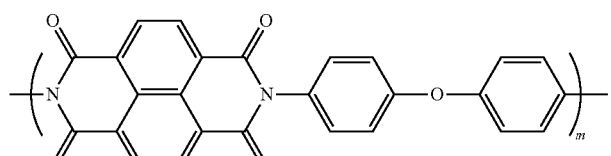
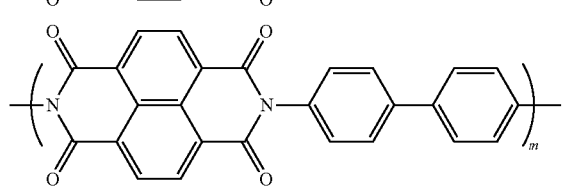
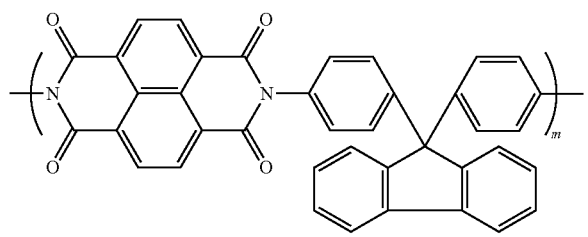
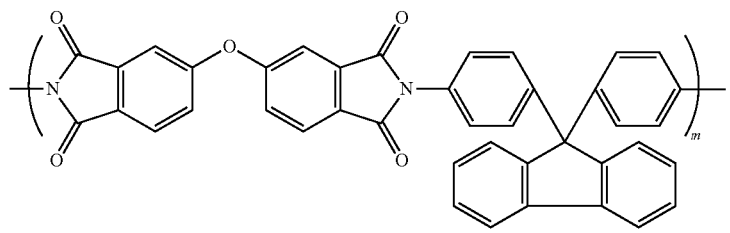
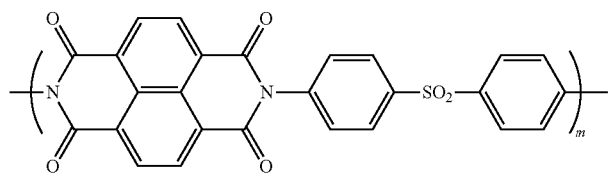
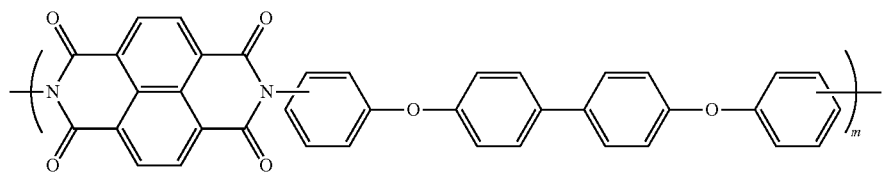
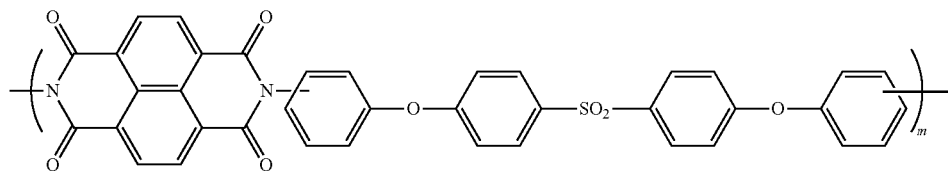
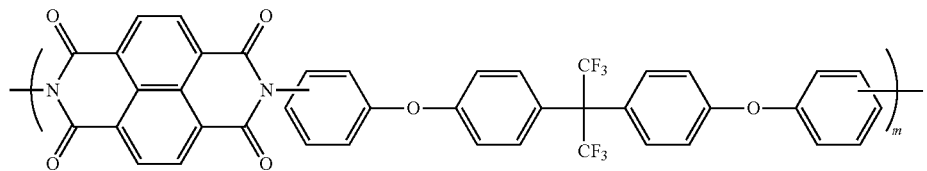

A polyamide having an oxocarbon group represented by the formula (1), a polybenzoxazole having an oxocarbon group represented by the formula (1), a polybenzimidazole having an oxocarbon group represented by the formula (1), and a poly(arylene ether) having an oxocarbon group represented by the formula (1) are exemplified by polymers having a repeating unit in which an oxocarbon group is coupled with a repeating unit represented below, and the oxocarbon group substitutes any of substitutable hydrogen atoms of the repeating units represented below.

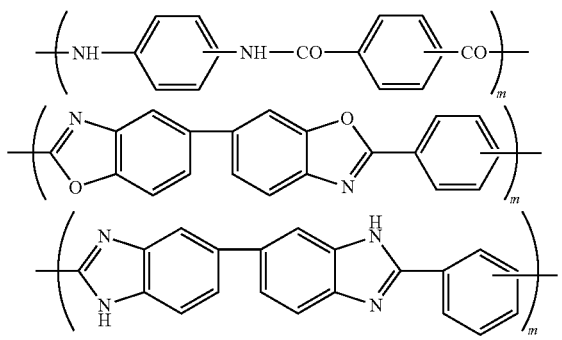

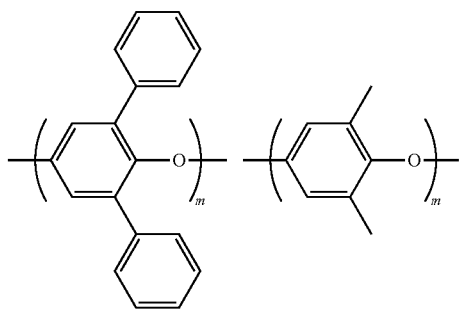

A polyarylene having an oxocarbon group represented by the formula (1) is exemplified by a polymer having a repeating unit in which an oxocarbon group is coupled with a repeating unit represented below, and the oxocarbon group substitutes any of substitutable hydrogen atoms of the repeating units represented below.

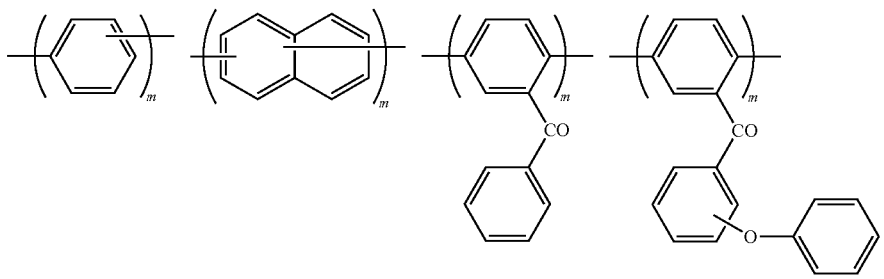

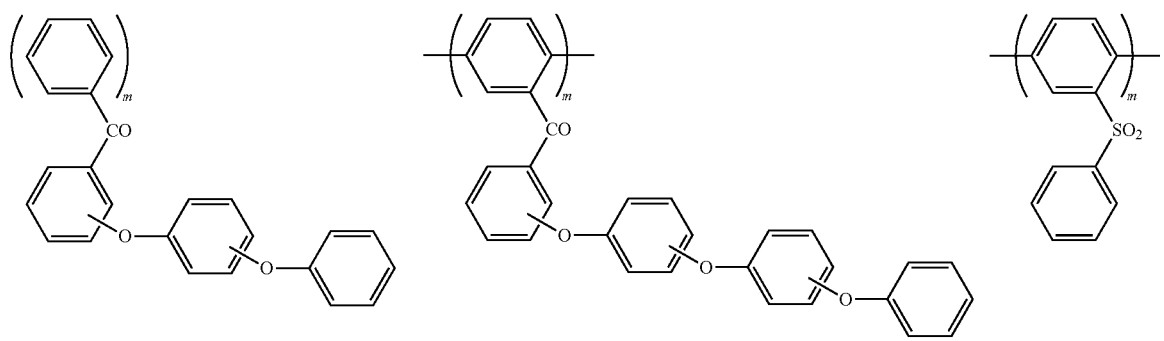

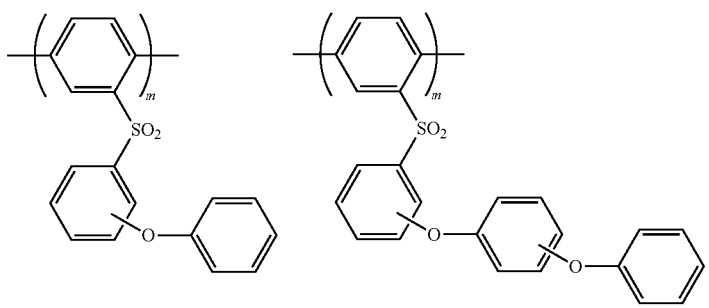

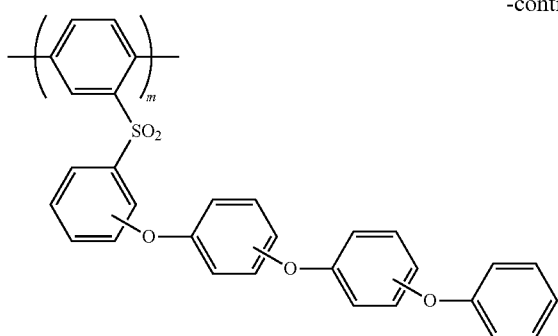
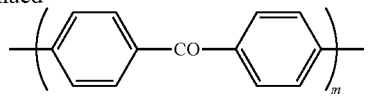
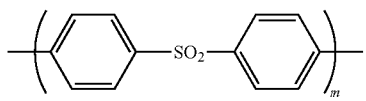
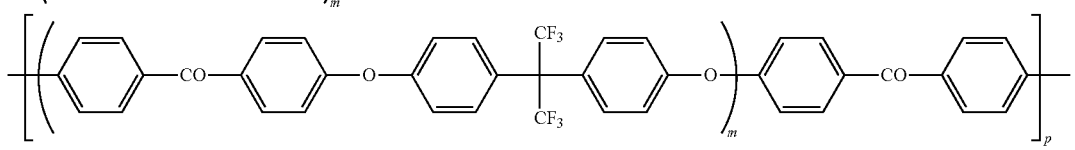
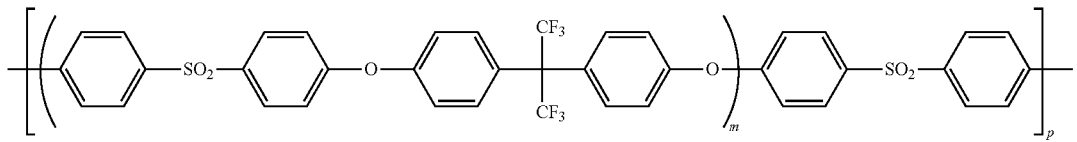
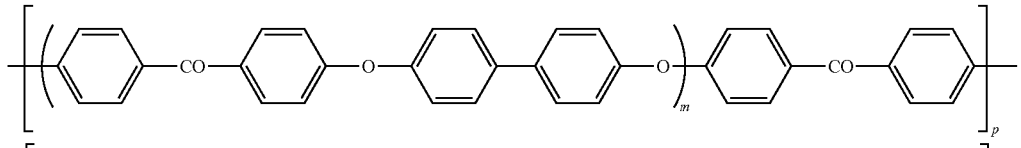
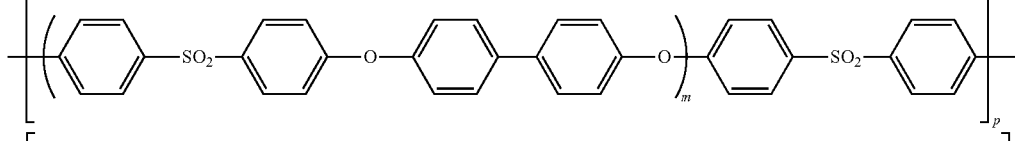
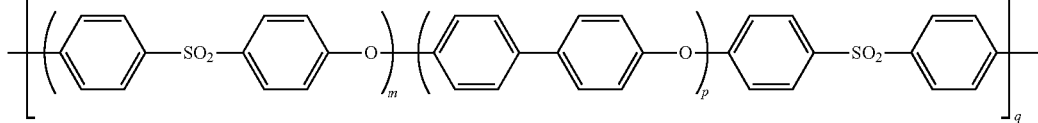
A poly(ether ketone) having an oxocarbon group represented by the formula (1) is exemplified by a polymer having a repeating unit in which an oxocarbon group is coupled with a repeating unit represented below, and the oxocarbon group substitutes any of substitutable hydrogen atoms of the repeating units represented below.
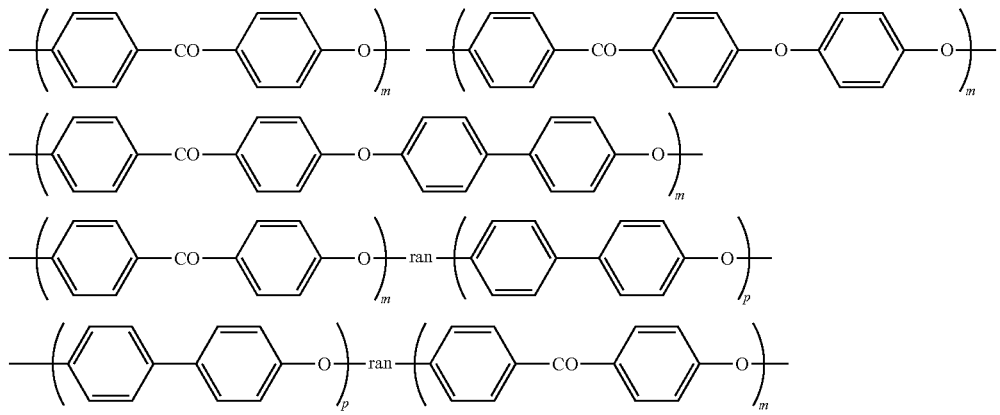

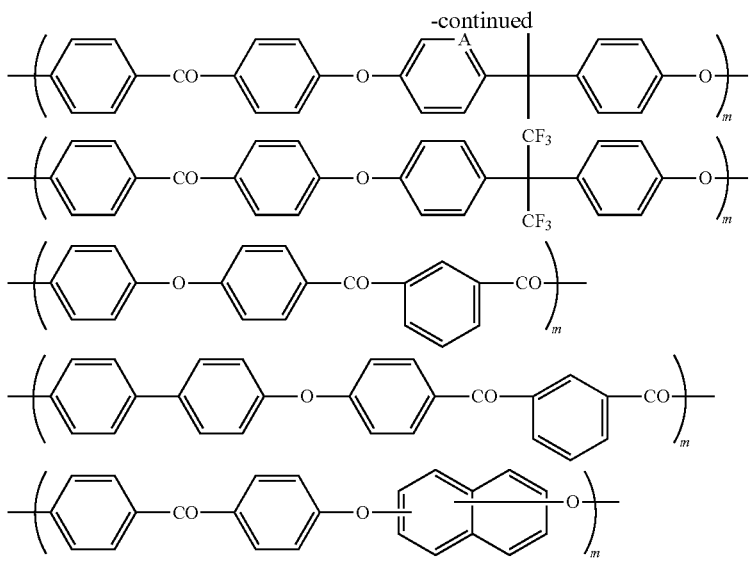
A poly(ether sulfone) having an oxocarbon group represented by the formula (1) is exemplified by a polymer having a repeating unit in which an oxocarbon group is coupled with a repeating unit represented below, and the oxocarbon group substitutes any of substitutable hydrogen atoms of the repeating units represented below.
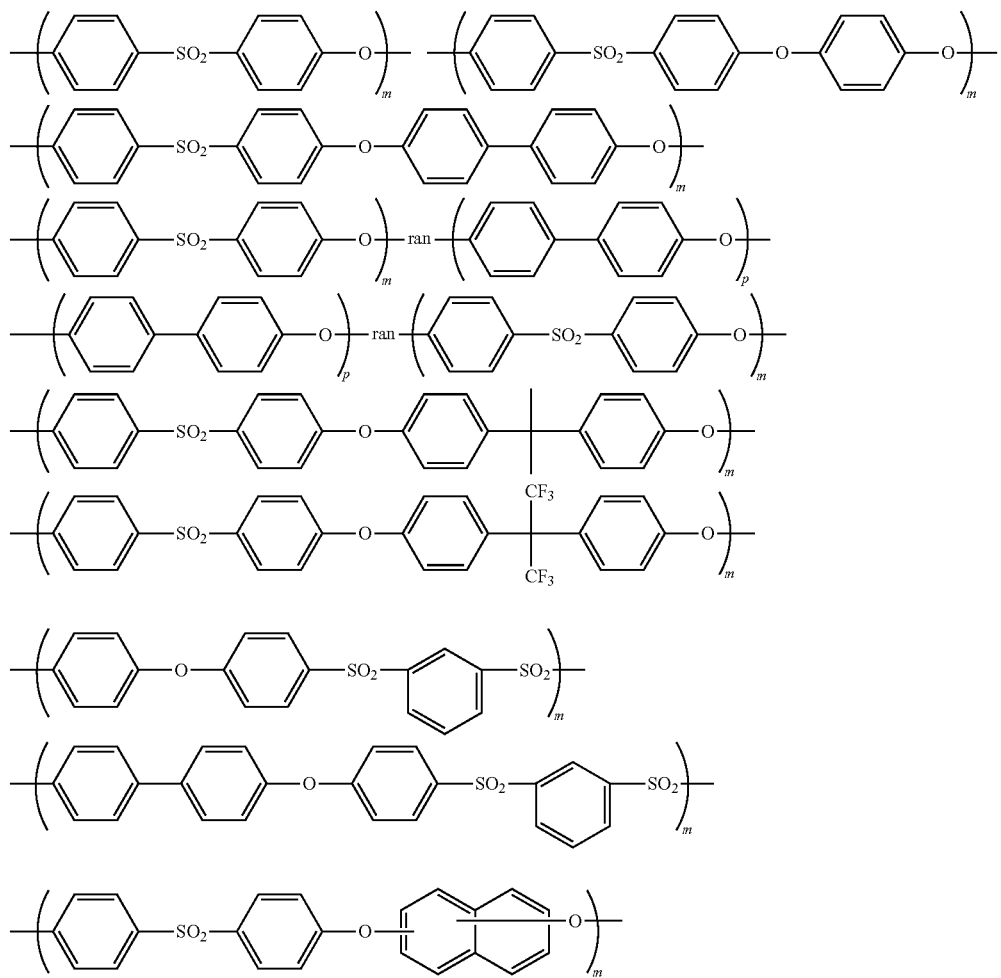

A poly(arylene sulfide) having an oxocarbon group represented by the formula (1), a polyphthalazinone having an oxocarbon group represented by the formula (1), and a polyphosphazene having an oxocarbon group represented by the formula (1) are exemplified by polymers having a repeating unit in which an oxocarbon group is coupled with a repeating unit represented below, and the oxocarbon group substitutes any of substitutable hydrogen atoms of the repeating units represented below. The A has the same meaning mentioned above.

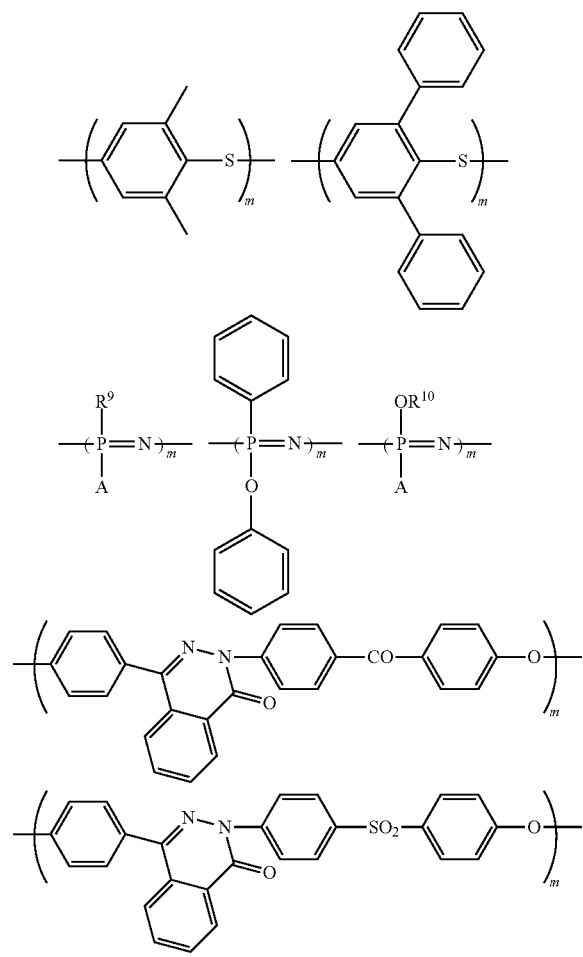

(wherein $R^9$ and $R^{10}$ independently represent hydrogen atom, fluorine atom, chlorine atom, methyl group, trifluoromethyl group, or phenyl group).

The number of oxocarbon groups coupled to the repeating unit exemplified above may be one or two or more. The oxocarbon groups coupled to the repeating unit may be same or different from each other. The oxocarbon groups may be coupled with not all of the repeating units present in a polymer.

Among polymers mentioned above, preferable polymers are vinyl polymers, polybenzoxazoles, polybenzimidazoles, poly(arylene ether)s, polyarylenes, poly(ether ketone)s, poly(ether sulfone)s, and polyphosphazenes, and copolymers thereof, and mixtures thereof. More preferable polymers are polyimides, polyarylenes, poly(ether ketone)s, and poly(ether sulfone)s, and copolymers or mixtures thereof.

Even more preferable polymers are polyarylenes, poly(ether ketone)s, and poly(ether sulfone)s, and copolymers or mixtures thereof; and most preferable polymers are polyethersulfones.

In view of water resistance required for polymer electrolytes, the polymer having an oxocarbon group represented by the formula (1) preferably has a phenyl-phenyl bond in the main chain thereof. As examples, included are polyarylenes, poly(ether sulfone)s having a phenyl-phenyl bond, poly(ether ketone)s having a phenyl-phenyl bond, and polyimides having a phenyl-phenyl bond, and most preferable polymers are poly(ether sulfone)s having a phenyl-phenyl bond.

The polymer of the invention, of which structures are exemplified above, does not have any particular limit in the molecular weight thereof, the molecular weight thereof preferably being about 5000 to about 1000000, more preferably being about 10000 to about 500000, and particularly preferably being about 20000 to about 300000. If being less than 5000, it tends to be difficult to retain a form of membrane when the polymer is used as a membrane, and if being 1000000 or more, it tends to be hard to mold in a membrane shape.

The polymer of this invention has an ion exchange capacity of bigger than 3.0 meq/g as mentioned previously. The polymer of the invention preferably has an ion-exchange capacity of 3.0 meq/g to 8 meq/g. If the polymer has more than 8 meq/g, it tends to be unfavorable in view of water resistance. The ion-exchange capacity is preferably 3.2 to 6 meq/g, more preferably 3.4 to 5 meq/g, and most preferably 3.6 to 4.5 meq/g.

A method for producing the polymer of the invention is explained.

The method for producing the polymer of the invention includes:

(A) a method of introducing an oxocarbon group represented by the formula (1) in a polymer;
(B) a method of polymerizing a monomer including an oxocarbon group represented by the formula (1); and the like.

Any of the methods (A) and (B) can be carried out by the following methods:

(I) a method of synthesizing an aliphatic compound or aromatic compound having a group represented by the formula (1) with using a lithium reagent (Journal of Organic Chemistry, 53, 2482, 2477 (1988));
(II) a method of synthesizing an aliphatic compound or aromatic compound having a group represented by the formula (1) with using a Grignard reagent (Heterocycles, 27(5), 1191 (1988));
(III) a method of synthesizing an aliphatic compound or aromatic compound having a group represented by the formula (1) with using a tin reagent (Journal of Organic Chemistry, 55, 5359 (1990), Tetrahedron Letters, 31(30), 4293 (1990)); and
(IV) a method of synthesizing an aromatic compound having a group represented by the formula (1) with a Friedel Crafts reaction (Synthesis, page 46 (1974)). For example, as the method (A), included is a method of binding an group represented by the formula (1) to a polymer not having a group represented by the formula (1) with applying any of the methods of (I) to (IV) mentioned above; or as the method (B), included is a method of synthesizing an aliphatic compound or aromatic compound having a group represented by the formula (1), thereby polymerizing the resulting compound to obtain an objective polymer also with applying any of the methods of (I) to (IV).

Explained as follows is the method (A) that a polymer is introduced with an oxocarbon group represented by the formula (1), specifically that a polymer having a repeating unit of diphenylsulfone is introduced with a group of which structure in the formula (1) is defined with $X^1=X^2=-O-$, $Z=-CO-$, and n=1.

Included is a method that a polymer having a diphenylsulfone as a repeating unit thereof can be reacted with alkyl lithium in a solution under an inert gas atmosphere to generate an anion in the polymer chain thereof, the resulting reactant which is a lithiated polymer is reacted with 3,4-dialkoxy-3-cyclobutene-1,2-dione and then treated under an acidic condition.

The polymer having a diphenylsulfone as a repeating unit may have an aromatic halide group in addition so that the polymer of the invention has an ion exchange capacity of bigger than 3.0 meq/g. Typical examples of the aromatic halide include aromatic chloride, aromatic bromide and aromatic iodide. Preferable halogen is bromide because bromide is easily introduced into the polymer using bromine. Catalysts, for example iron, iron bromide and the like, may be used if the bromine is difficult to be introduced.

The polymers having a diphenylsulfone as a repeating unit and/or having aromatic halide are exemplified by polymers having the following repeating units, wherein m and p represent the number of repeatings.

and crown ether. Preferable ethers are cyclic ethers such as tetrahydrofuran, 1,3-dioxolane, 1,4-dioxane, 1,3-dioxane, and tetrahydropyran, particularly preferable ethers are tetrahydrofuran and 1,3-dioxolane, and most preferable ether is tetrahydrofuran. The ether solvent may be used together with aliphatic hydrocarbon solvents and/or aromatic hydrocarbon solvents. The aliphatic hydrocarbon solvents include cyclohexane, hexane, heptane, and the like; the aromatic hydrocarbon solvents include benzene, toluene, xylene, and the like.

The alkyl lithium is reacted with a polymer usually at a temperature of −150° C. to 20° C., preferably −120° C. to 0° C., and more preferably −100° C. to −20° C. The alkyl lithium is reacted with the polymer of which concentration is usually 0.01 to 50% by weight, preferably 0.02 to 30% by weight, more preferably 0.1 to 20% by weight, particularly preferably 0.2 to 10% by weight, and most preferably 0.5 to 5% by weight. The alkyl lithium is reacted with the polymer usually for 1 minute to 10 hours, preferably 2 minutes to 5 hours, more preferably 5 minutes to 4 hours, and particularly preferably 10 minutes to 3 hours.

After generating an anion in the polymer by the manner mentioned above, the polymer is reacted with 3,4-dialkoxy-3-cyclobutene-1,2-dione; the 3,4-dialkoxy-3-cyclobutene-1,

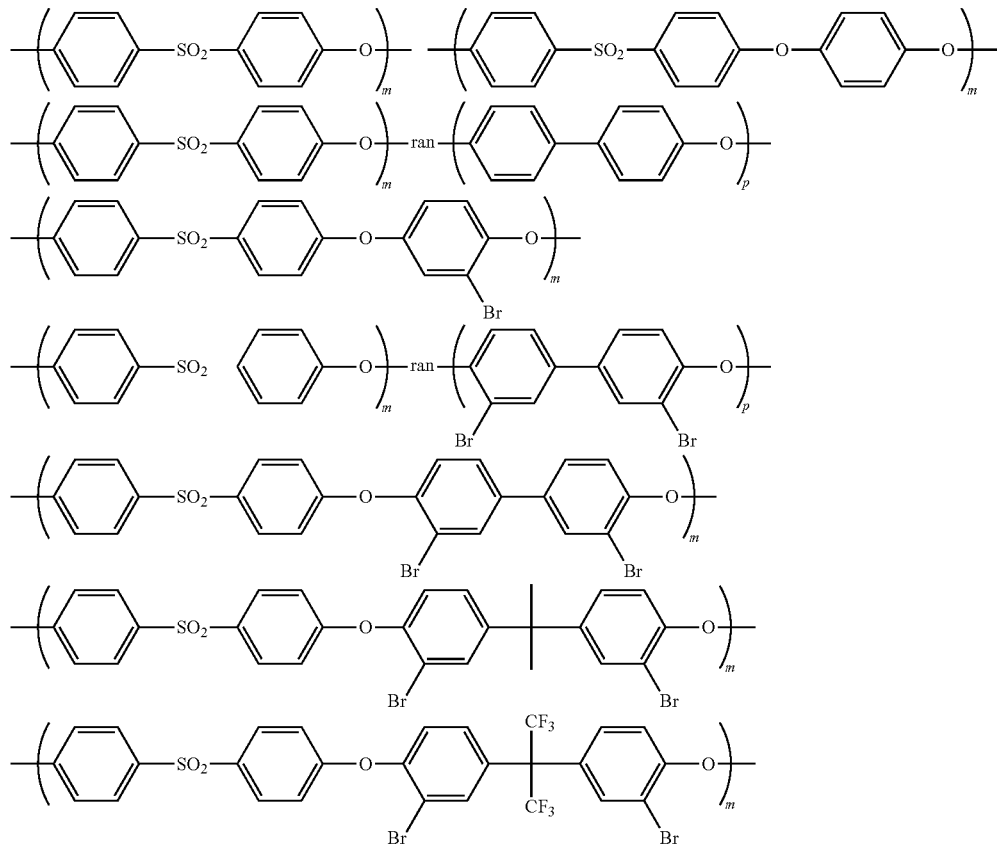

The alkyl lithium includes methyl lithium, ethyl lithium, n-butyl lithium, sec-butyl lithium, tert-butyl lithium, phenyl lithium and the like.

The solvent used for the reaction is not limited as long as being unreactive with alkyl lithium and able to dissolve the polymer. Such solvents include ether solvents such as tetrahydrofuran, 1,3-dioxolane, 1,4-dioxane, 1,3-dioxane, tetrahydropyran, dibutylether, tert-butylmethyl ether, diphenyl ether, 2-dione used here, for example, includes 3,4-dimethoxy-3-cyclobutene-1,2-dione, 3,4-diethoxy-3-cyclobutene-1,2-dione, 3,4-di(n-propoxy)-3-cyclobutene-1,2-dione, 3,4-diisopropoxy-3-cyclobutene-1,2-dione, 3,4-di(n-butoxy)-3-cyclobutene-1,2-dione, 3,4-di(sec-butoxy)-3-cyclobutene-1,2-dione, 3,4-di(tert-butoxy)-3-cyclobutene-1,2-dione, 3,4-diphenoxy-3-cyclobutene-1,2-dione, and 3,4-dinaphthoxy-3-cyclobutene-1,2-dione. Among them, preferable 3,4- dialkoxy-3-cyclobutene-1,2-diones are 3,4-dimethoxy-3-cyclobutene-1,2-dione, 3,4-diethoxy-3-cyclobutene-1,2-dione, 3,4-diisopropoxy-3-cyclobutene-1,2-dione, and 3,4-di(n-butoxy)-3-cyclobutene-1,2-dione.

Such 3,4-dialkoxy-3-cyclobutene-1,2-dione is reacted with the polymer usually at a temperature of −150° C. to 20° C., preferably −120° C. to 0° C., and more preferably −100° C. to −20° C. A reaction temperature is usually for 1 minute to 10 hours, preferably 2 minutes to 5 hours, more preferably 5 minutes to 4 hours, and particularly preferably 10 minutes to 3 hours. An amount of 3,4-dialkoxy-3-cyclobutene-1,2-dione to be used for the reaction is preferably equal to or more than the moles of the alkyl lithium used.

Such 3,4-dialkoxy-3-cyclobutene-1,2-dione should be further purified so that the resulting polymer has an ion exchange capacity of bigger than 3.0 meq/g as mentioned previously. Using less purified 3,4-dialkoxy-3-cyclobutene-1,2-dione which include acidic impurities might result in lower ion exchange capacity than 3.0 meq/g. Alternatively, in order to remove the effect of acidic impurity, treatment with small amount of alkyllithium may be used before reacting with the lithiated polymer.

A reagent used for a treatment under an acidic condition includes hydrochloric acid, sulfuric acid, nitric acid, acetic acid, trifluoroacetic acid, formic acid, and oxalic acid, and mixtures thereof. A treatment temperature is usually −150° C. to 200° C., preferably −100° C. to 150° C., and more preferably −80° C. to 120° C. A treatment time is usually for 10 minutes to 20 hours, preferably 30 minutes to 15 hours, and particularly preferably 1 hour to 10 hours. The treatment under an acidic condition may be conducted in a homogeneous system or a heterogeneous system. The treated polymer, if being treated in a heterogeneous system, can be collected by filtration; or, if being treated in a homogeneous system, can be collected by filtration after being precipitated in a poor solvent or non-solvent.

A ratio of the oxocarbon group introduced can be controlled by the amounts of alkyl lithium or 3,4-dialkoxy-3-cyclobutene-1,2-dione, or the like.

Explained as follows is a case of using the polymer of the invention for a diaphragm of electro-chemical devices such as fuel cells.

In this case, the polymer of the invention is usually used in the form of a film; and ways to convert the polymer to a film are not particularly limited, for example, preferably used is a method of forming a film from a solution of the polymer (a solution casting method).

A film is specifically formed by dissolving a polymer in an appropriate solvent, casting the resultant solution on a glass plate, and then removing the solvent. The solvent used for film formation is not particularly limited as long as being able to dissolve a polymer and then be removed: suitably used solvents include non-protonic polar solvents such as N,N-dimethylformamide (DMF), N,N-dimethyl acetamide (DMAc), N-methyl-2-pyrrolidone (NMP), and dimethylsulfoxide (DMSO); chlorine-containing solvents such as dichloromethane, chloroform, 1,2-dichloroethane, chlorobenzene, and dichlorobenzene; alcoholic solvents such as methanol, ethanol, and propanol; alkyleneglycol monoalkyl ether solvents such as ethyleneglycol monomethyl ether, ethyleneglycol monoethyl ether, propyleneglycol monomethyl ether, and propyleneglycol monoethyl ether; and ether solvents such as tetrahydrofuran, 1,3-dioxolane, 1,4-dioxane, 1,3-dioxane, tetrahydropyran, dibutylether, tert-butylmethylether, diphenyl ether, and crown ether. They may be used alone or as a mixture of two or more kinds thereof depending on requirements.

Among them, dimethylsulfoxide, N,N-dimethylformamide, N,N-dimethyl acetamide, N-methylpyrrolidone, tetrahydrofuran, and 1,3-dioxolane are preferable solvent due to their high ability of dissolving a polymer.

A film thickness is not particularly limited, preferably being 10 to 300 μm, and particularly preferably 20 to 100 μm. When the film is thinner than 10 μm, it often does not satisfy a strength for practical usage; and when being thicker than 300 μm, the film resistance is so large that characteristics of electro-chemical devices tend to be decreased. The film thickness can be controlled by a concentration of the solution or a thickness cast on a substrate.

If the polymer after hydrolysis is insoluble in any solvents even though the polymer before hydrolysis is soluble, the membrane can be made before hydrolysis, and then can be hydrolyzed with membrane shape.

For the purpose of improving various properties of the film, plasticizers, stabilizers, mold release agents, and the like which are used for conventional polymers may be added to the polymer of the invention. The polymer of the invention may be alloyed with other polymer by casting a mixture dissolving together with the other polymer in the same solvent, or other ways.

It is known for the fuel cell usage that inorganic or organic fine particles are added as a water retention agent to control water content. Any of such known methods may be applied as long as not violating the object of the invention.

The film may be cross-linked by irradiation of electron beams or radioactive rays in order to enhance mechanical properties thereof. Furthermore, rendering a film complex by impregnating with a porous film or sheet, or mixing it with a fiber or pulp are also known as ways of reinforcing the film; any of these known methods may be applied as long as not violating the object of the invention.

A fuel cell of the invention is explained as follows.

The fuel cell of the invention can be produced by assembling a catalyst and an electro-conductive material as a collector on the opposite faces of a polymer film.

The catalyst is not particularly limited as long as being capable of activating oxidation-reduction reaction of hydrogen atom or oxygen atom, known catalysts can be used, and preferable catalyst is a fine particle of platinum. The fine particle of platinum is often used by being carried on a particle or fibrous carbon such as activated carbon or graphite, which is preferably used.

The electro-conductive material as a collector may use known materials, and porous carbon woven fabrics, carbon nonwoven fabrics or carbon papers are preferable electro-conductive material to effectively transport raw gases to the catalyst.

Assembling a platinum fine particle or a carbon carrying a platinum fine particle with a porous carbon nonwoven fabric or a carbon paper, or further assembling such assembled with a polymer electrolyte film can be performed with known methods such as disclosed in J. Electrochem. Soc.: Electrochemical Science and Technology, 1988, 135(9), 2209.

The polymer of the invention can be also used as a proton conductive material which is one of components of a catalytic composition which composes a catalyst layer of polymer electrolyte membrane fuel cells. Thus produced fuel cell of the invention can be used with various fuel formations such as hydrogen gas, reformed hydrogen gases, methanol, and dimethylether.

While the embodiments of the invention have been described, it is understood that the above disclosed embodiments of the invention are for purposes of illustration and not limitation of the scope of the invention. The scope of the invention is designated with the scope of Claims, and further encompasses all changes which will become possible within meanings and scopes equivalent to the description of the scope of Claims.

EXAMPLES

The invention is explained in detail by referring Examples, but should not be construed to be limited thereto.

A proton conductivity was determined with an alternate current method at 80° C. under a relative humidity of 99%.

An ion exchange capacity was determined by acid-base back titration.

A water uptake was defined by a ratio of an incremental film weight after a dried film was immersed in de-ionized water at 50° C. for 2 hours to the weight of the original dried film.

Referential Example

To a stirred solution of poly(oxy-4,4'-biphenyleneoxy-4,4'-diphenylsulfone) (PES-DOD, manufactured by Sigma-Aldrich Co., 4.00 g, 9.99 mmol (repeating unit)) in $CH_2Cl_2$ (80 ml) was added bromine (12.4 g, 77.6 mmol) dropwise at room temperature. The reaction was stirred at room temperature for 2 h and the mixture was added into a solution of $Na_2SO_3$ (50 g, 397 mmol) in water (500 ml). $CH_2Cl_2$ of the mixture was removed by evaporator and then filtered to yield a crude brominated polymer. The crude polymer was purified by dissolving in a small amount of NMP and reprecipitated with methanol. Filtration gave 6.70 g of purified brominated polymer (PES-DOD-Br). $^1$H-NMR measurement indicated that bromination proceeded. Elemental analysis: Br=28.0 wt %

Example 1

A stirred solution of PES-DOD-Br (0.50 g, 1.75 mmol (the number of moles of Br)) in 120 ml of THF was cooled to −78° C. and 10 mmol of butyllithium (4.0 ml of a 2.5 M solution) was added dropwise and stirring was continued at −78° C. for 30 min (solution A). In a separate flask, 2.40 g (12 mmol) of diisopropyl squarate was dissolved in 30 ml of THF, cooled to −78° C. (solution B) and solution A was cannulated into the solution B. Stirring was continued at −78° C. for 2 h and quenched with 5 ml of 2N—HCl at −78° C. Approximately three quarters of the solvent was removed under reduced pressure and the remaining solution was added to 300 ml of 2N—HCl to precipitate the crude polymer. The polymer was filtered and washed with water thoroughly and dried. The polymer was dissolved in 20 ml of DMF and poured into 2N—HCl to precipitate purified polymer. The polymer was dried at room temperature to yield 0.51 g of isopropyl squarate formed polymer (Polymer A'). The structure was confirmed by $^1$H-NMR and the IR.

In a 100 ml round bottomed flask, 0.40 g of the polymer B and 20 ml of concentrated HCl (12 N) were stirred at 100° C. for 6 h to hydrolyze the isopropoxy group. The polymer was filtered, washed with deionized water thoroughly and dried at ambient temperature to yield the polymer bearing squaric acid groups (Polymer A). The structure was confirmed by $^1$H-NMR and IR. After preparing a solution of the Polymer A obtained with using DMF, the solution was cast to obtain a membrane (Membrane A) with 50 μm thickness. A proton conductivity, ion-exchange capacity, and water uptake of the Membrane A are shown in Table 1.

Example 2

A stirred solution of PES-DOD-Br (1.00 g, 3.50 mmol (the number of moles of Br)) in 100 ml of THF was cooled to −78° C. and 12.5 mmol of butyllithium (5 ml of a 2.5 M solution) was added dropwise and stirring was continued at −78° C. for 15 min (solution C). In a separate flask, 4.00 g (20.2 mmol) of diisopropyl squarate was dissolved in 50 ml of THF, cooled to −78° C. and 1.8 mmol of phenyl lithium (11.0 ml of a 1.8 M dibutylether solution) was added to quench proton source (solution D). The solution C was cannulated into the solution D. Stirring was continued at −78° C. for 2 h and quenched with 5 ml of 2N—HCl at −78° C. Approximately three quarters of the solvent was removed under reduced pressure and the remaining solution was added to 300 ml of 2N—HCl to precipitate the crude polymer. The polymer was filtered and washed thoroughly with water and dried. The polymer was dissolved in 20 ml of DMF and poured into 2N—HCl to precipitate the purified polymer. The polymer was dried at room temperature to yield 1.10 g of isopropyl squarate formed polymer (polymer B'). The structure was confirmed by $^1$H-NMR and the IR.

In a 100 ml round bottomed flask, 0.90 g of the polymer III and 20 ml of concentrated HCl (12 N) were stirred at 100° C. for 6 h to hydrolyze the isopropoxy group. Next, the polymer was filtered, thoroughly washed with deionized water and dried at ambient temperature to yield the polymer bearing squaric acid groups (Polymer B). The structure was confirmed by $^1$H-NMR and IR. After preparing a solution of the polymer obtained with using 1,3-dioxolane, the solution was cast to obtain a membrane (Membrane B) with 48 μm thickness. A proton conductivity, ion-exchange capacity, and water uptake of the Membrane B are shown in Table 1.

Example 3

A stirred solution of PES-DOD-Br (2.00 g, 7.00 mmol (the number of moles of Br)) in 150 ml of THF was cooled to −78° C. and 25 mmol of butyllithium (10 ml of a 2.5 M solution) was added dropwise and stirring was continued at −78° C. for 15 min (solution E). In a separate flask, 10.0 g (50.4 mmol) of diisopropyl squarate was dissolved in 30 ml of THF, cooled to −78° C. and 1.8 mmol of phenyllithium (11.0 ml of a 1.8 M dibutylether solution) was added to quench proton source (solution F). The solution F was cannulated into the solution E. Stirring was continued at −78° C. for 2 h and quenched with 5 ml of 2N—HCl at −78° C. Approximately three quarters of the solvent was removed under reduced pressure and the remaining solution was added to 300 ml of 2N—HCl to precipitate the crude polymer. The polymer was filtered and washed with water thoroughly and dried. The polymer was dissolved in 20 ml of THF and poured into 2N—HCl to precipitate the purified polymer. The polymer was dried at room temperature to yield 1.98 g of isopropyl squarate formed polymer (polymer C'). The structure was confirmed by $^1$H-NMR and the IR.

After preparing a solution of the polymer obtained with using THF, the solution was cast to obtain a membrane (Membrane C') with 32 μm thickness.

In a 100 ml round bottomed flask, approximately 5 cm of diameter of the membrane and 20 ml of concentrated HCl (12 N) were stirred at 100° C. for 6 h to hydrolyze isopropoxy group. The membrane was washed thoroughly with deionized water and dried at ambient temperature to yield the polymer membrane bearing squaric acid groups (Membrane C). The structure was confirmed by IR.

A proton conductivity, ion-exchange capacity, and water uptake of the membrane C are shown in Table 1.

Example 4

A stirred solution of PES-DOD-Br (2.00 g, 7.00 mmol (the number of moles of Br)) in 120 ml of THF was cooled to −78°

C. and 20 mmol of butyl lithium (8.0 ml of a 2.5 M solution) was added dropwise and stirring was continued at −78° C. for 15 min (solution G). In a separate flask, 8.0 g (40.3 mmol) of diisopropyl squarate was dissolved in 30 ml of THF, cooled to −78° C. and 2.5 mmol of n-butyllithium (11.0 ml of a 2.5 M hexane solution) was added to quench the acidic impurity (solution H). The solution H was cannulated into the solution G. Stirring was continued at −78° C. for 2 h and quenched with 5 ml of 2N—HCl at −78° C. Approximately three quarters of the solvent was removed under reduced pressure and the remaining solution was added to 300 ml of 2N—HCl to precipitate the crude polymer. The polymer was filtered and washed thoroughly with water and dried. The polymer was dissolved in 20 ml of THF and poured into 2N—HCl to precipitate the purified polymer. The polymer was dried at room temperature to yield 2.79 g of isopropyl squarate formed polymer (polymer D'). The structure was confirmed by $^1$H-NMR and the IR.

After preparing a solution of the polymer obtained with using THF, the solution was cast to obtain a membrane (Membrane D') with 32 μm thickness.

In a 100 ml round bottomed flask, approximately 5 cm of diameter of the membrane D' and 20 ml of concentrated HCl (12 N) were stirred at 100° C. for 6 h to hydrolyze the isopropoxy group. The membrane was washed with deionized water thoroughly and dried at ambient temperature to yield the polymer membrane bearing squaric acid groups (Membrane D). The structure was confirmed by IR.

A proton conductivity, ion-exchange capacity, and water uptake of the Membrane D are shown in Table 1.

Comparative Example 1

A stirred solution of PES-DOD (1.00 g, 2.5 mmol (the number of moles of repeating unit)) in 120 ml of 1,3-dioxolane was cooled to −78° C. and 10.0 mmol of butyllithium (4.0 ml of a 2.5 M solution) was added dropwise and stirring was continued at −78° C. for 60 min (solution J). In a separate flask, 2.4 g (12.1 mmol) of diisopropyl squarate was dissolved in 20 ml of 1,3-dioxolane, cooled to −78° C. and 1.8 mmol of phenyl lithium (11.0 ml of a 1.8 M dibutylether solution) was added to quench the acidic impurity (solution K). The solution J was cannulated into the solution K. Stirring continued at −78° C. for 3 h and quenched with 5 ml of 2N—HCl at −78° C. Approximately three quarters of the solvent was removed under reduced pressure and the remaining solution was added to 300 ml of 2N—HCl to precipitate crude polymer. The polymer was filtered and washed thoroughly with water and dried. The polymer was dissolved in 20 ml of DMF and poured into 2N—HCl to precipitate the purified polymer. The polymer was dried at room temperature to yield 0.90 g of isopropyl squarate formed polymer (polymer E'). The structure was confirmed by $^1$H-NMR and IR. In a 100 ml round bottomed flask, 0.90 g of the polymer E' and 20 ml of concentrated HCl (12 N) were stirred at 100° C. for 6 h to hydrolyze isopropoxy group. The polymer was filtered, washed thoroughly with deionized water and dried at ambient temperature to yield the polymer bearing squaric acid groups (Polymer E). The structure was confirmed by $^1$H-NMR and IR. After preparing a solution of the polymer obtained with using 1,3-dioxolane, the solution was cast to obtain a membrane (Membrane E) with 46 μm thickness. A proton conductivity, ion-exchange capacity, and water uptake of the Membrane E are shown in Table 1.

Comparative Example 2

In a flask, 1.00 g (2.26 mmol in terms of repeating unit) of the polysulfone (manufactured by Sigma-Aldrich Co.) and 10 ml of concentrated sulfuric acid (97% by weight) were charged, and then agitated at a room temperature. When one hour passed after commencement of the agitation, the reaction mass was poured into a huge amount of ice water to precipitate a polymer. The polymer precipitated was washed with water until the washing solution became neutral, and then dried. This polymer was dissolved with DMAc and subjected to film casting to obtain a membrane (Membrane F). The Membrane F did not have enough strength to measure a proton conductivity. The ion-exchange capacity and water uptake of the Membrane F are shown in Table 1.

TABLE 1

| | Proton conductivity (S/cm) | Ion-exchange capacity (meq/g) | Water uptake (%) |
|---|---|---|---|
| Example 1 | 6.4 × 10$^{-2}$ | 3.5 | 49 |
| Example 2 | 7.6 × 10$^{-2}$ | 3.9 | 57 |
| Example 3 | 1.3 × 10$^{-1}$ | 3.9 | 66 |
| Example 4 | 1.5 × 10$^{-1}$ | 4.1 | 65 |
| Comparative Example 1 | 1.1 × 10$^{-2}$ | 2.7 | 12 |
| Comparative Example 2 | Impossible to measure | 1.6 | 63 |

INDUSTRIAL APPLICABILITY

The polymer having more than 3.0 meq/g of oxocarbon groups of the invention has high proton conductivity and it is useful for a polymer electrolyte which is an ingredient of proton conductive membrane for polymer electrolyte membrane fuel cells which use gaseous fuels such as hydrogen gas or liquid fuels such as methanol and dimethylether.

The invention claimed is:
1. A polymer having an oxocarbon group represented by the following formula (1)

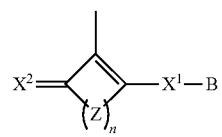

(1)

wherein X$^1$ and X$^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 2, n Z-groups may be same or different from each other; and B represents hydrogen atom or a monovalent metal atom, wherein ion exchange capacity of the polymer is bigger than 3.0 meq/g, and the main chain structure of the polymer is selected from the group consisting of vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof.

2. The polymer according to claim 1, wherein Z is at least one selected from the group consisting of —CO—, —C(S)—, and —C(NH)—.

3. The polymer according to claim 1, wherein $X^1$ and $X^2$ are —O—, and Z is —CO.

4. The polymer according to claim 1, having a phenyl-phenyl bond in the main chain thereof.

5. A polymer electrolyte comprising a polymer having an oxocarbon group represented by the following formula (1)

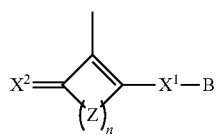

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 2, n Z-groups may be same or different from each other; and B represents hydrogen atom or a monovalent metal atom, wherein ion exchange capacity of the polymer is bigger than 3.0 meq/g, and the main chain structure of the polymer is selected from the group consisting of vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof.

6. A polymer electrolyte membrane comprising a polymer electrolyte comprising a polymer having an oxocarbon group represented by the following formula (1)

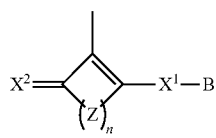

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 2, n Z-groups may be same or different from each other; and B represents hydrogen atom or a monovalent metal atom, wherein ion exchange capacity of the polymer is bigger than 3.0 meq/g, and the main chain structure of the polymer is selected from the group consisting of vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof.

7. A catalytic composition comprising a polymer electrolyte comprising a polymer having an oxocarbon group represented by the following formula (1)

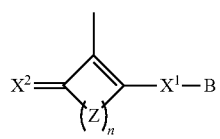

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 2, n Z-groups may be same or different from each other; and B represents hydrogen atom or a monovalent metal atom, wherein ion exchange capacity of the polymer is bigger than 3.0 meq/g, a reaction which the catalytic composition catalyzes is an oxidation-reduction reaction of hydrogen atoms and oxygen atoms, and the main chain structure of the polymer is selected from the group consisting of vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof.

8. A polymer electrolyte membrane-electrode assembly comprising a polymer electrolyte comprising a polymer having an oxocarbon group represented by the following formula (1)

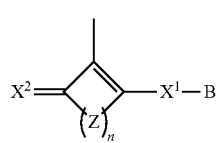

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 2, n Z-groups may be same or different from each other; and B represents hydrogen atom or a monovalent metal atom, wherein ion exchange capacity of the polymer is bigger than 3.0 meq/g, and the main chain structure of the polymer is selected from the group consisting of vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof.

9. A polymer electrolyte membrane fuel cell comprising a polymer electrolyte comprising a polymer having an oxocarbon group represented by the following formula (1)

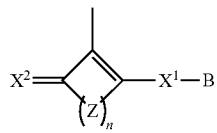

(1)

wherein $X^1$ and $X^2$ independently represent —O—, —S—, or —NR—, and Z represents —CO—, —C(S)—, —C(NR')—, alkylene group which may have substitution groups, or arylene group which may have substitution groups, wherein R and R' of NR and NR' independently represent hydrogen atom, alkyl group with carbon number of 1 to 6 which may have substitution groups, or aryl group with carbon number of 6 to 10 which may have substitution groups; n is a repeating number and represents the number of n=0 to 2, n Z-groups may be same or different from each other; and B represents hydrogen atom or a monovalent metal atom, wherein ion exchange capacity of the polymer is bigger than 3.0 meq/g, and the main chain structure of the polymer is selected from the group consisting of vinyl polymers, polyoxyalkylenes, polysiloxanes, polyesters, polyimides, polyamides, polybenzoxazoles, polybenzimidazoles, polyaryleneethers, polyarylenes, polyarylenesulfides, polyetherketones, polyethersulfones, and polyphosphazenes, and copolymers thereof.

* * * * *